(12) United States Patent
Kurzweil et al.

(10) Patent No.: US 8,156,160 B2
(45) Date of Patent: *Apr. 10, 2012

(54) POET PERSONALITIES

(75) Inventors: Raymond Kurzweil, Newton, MA (US); John A. Keklak, Sudbury, MA (US)

(73) Assignee: Kurzweil Cyber Art Technologies, Inc., Wellesley Hills, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/951,230

(22) Filed: Nov. 22, 2010

(65) Prior Publication Data

US 2011/0151416 A1 Jun. 23, 2011

Related U.S. Application Data

(63) Continuation of application No. 11/169,199, filed on Jun. 28, 2005, now Pat. No. 7,840,608, which is a continuation of application No. 10/639,918, filed on Aug. 12, 2003, now Pat. No. 7,836,069, which is a continuation of application No. 09/704,104, filed on Nov. 1, 2000, now Pat. No. 6,647,395.

(60) Provisional application No. 60/162,882, filed on Nov. 1, 1999.

(51) Int. Cl.
*G06F 15/00* (2006.01)
(52) U.S. Cl. .................................................. 707/804
(58) Field of Classification Search .................. None
See application file for complete search history.

(56) References Cited

U.S. PATENT DOCUMENTS

| 4,141,177 | A | * | 2/1979 | Vu | ................................. | 446/87 |
| 4,712,174 | A | * | 12/1987 | Minkler, II | ........................ | 704/1 |
| 5,708,825 | A | * | 1/1998 | Sotomayor | .................... | 715/205 |
| 6,370,498 | B1 | * | 4/2002 | Flores et al. | ..................... | 704/3 |

* cited by examiner

*Primary Examiner* — Neveen Abel Jalil
*Assistant Examiner* — Kellye Buckingham
(74) *Attorney, Agent, or Firm* — Fish & Richardson P.C.

(57) ABSTRACT

A method of generating a poet personality including reading poems, each of the poems containing text, generating analysis models, each of the analysis models representing one of poems and storing the analysis models in a personality data structure. The personality data structure further includes weights, each of the weights associated with each of the analysis models. The weights include integer values.

19 Claims, 11 Drawing Sheets and claims the benefit of
POET PERSONALITIES

CLAIM OF PRIORITY

This application is a continuation (and claims the benefit of priority under 35 USC 120) of U.S. application Ser. No. 11/169,199 filed Jun. 28, 2005, now U.S. Pat. No. 7,840,608, which is a continuation of U.S. application Ser. No. 10/639,918 filed Aug. 12, 2003 (now U.S. Pat. No. 7,836,069), which is a continuation of U.S. application Ser. No. 09/704,104, filed Nov. 1, 2000 (now U.S. Pat. No. 6,647,395), which claims priority to U.S. Patent Application Ser. No. 60/162,882 filed on Nov. 1, 1999. The disclosure of the prior applications are considered part of (and is incorporated by reference in) the disclosure of this application.

BACKGROUND

This invention relates to generating poetry from a computer.

A computer may be used to generate text, such as poetry, to an output device and/or storage device. The displayed text may be in response to a user input or via an automatic composition process. Devices for generating poetry via a computer have been proposed which involve set slot grammars in which certain parts of speech, that are provided in a list, are selected for certain slots.

SUMMARY

In an aspect, the invention features a method of generating a poet personality including reading poems, each of the poems containing text, generating analysis models, each of the analysis models representing one of poems and storing the analysis models in a personality data structure. The personality data structure further includes weights, each of the weights associated with each of the analysis models. The weights include integer values.

In another aspect a poet's assistant method including loading a word processing program, receiving a word in the word processing program provided by a user, displaying poet windows in response to receiving the word and processing the word in each of the windows. The poet windows may include combinations of a finish word window, a finish line window and a finish poem window. Processing the word in the finish word window includes loading an analysis model, locating the word in the analysis model and generating a proposed word in conjunction with the author analysis model.

The details of one or more embodiments of the invention are set forth in the accompanying drawings and the description below. Other features, objects, and advantages of the invention will be apparent from the description and drawings, and from the claims.

DESCRIPTION OF DRAWINGS

The foregoing features and other aspects of the invention will be described further in detail by the accompanying drawings, in which:

FIG. 4 is a table of exemplary word formats used by the process of FIG. 3.

FIG. 14 is a flow diagram of the generation of a poem with rhythm and rhyme structure used by the process of FIG. 3.

Like reference symbols in the various drawings indicate like elements.

DETAILED DESCRIPTION

Figure 1:
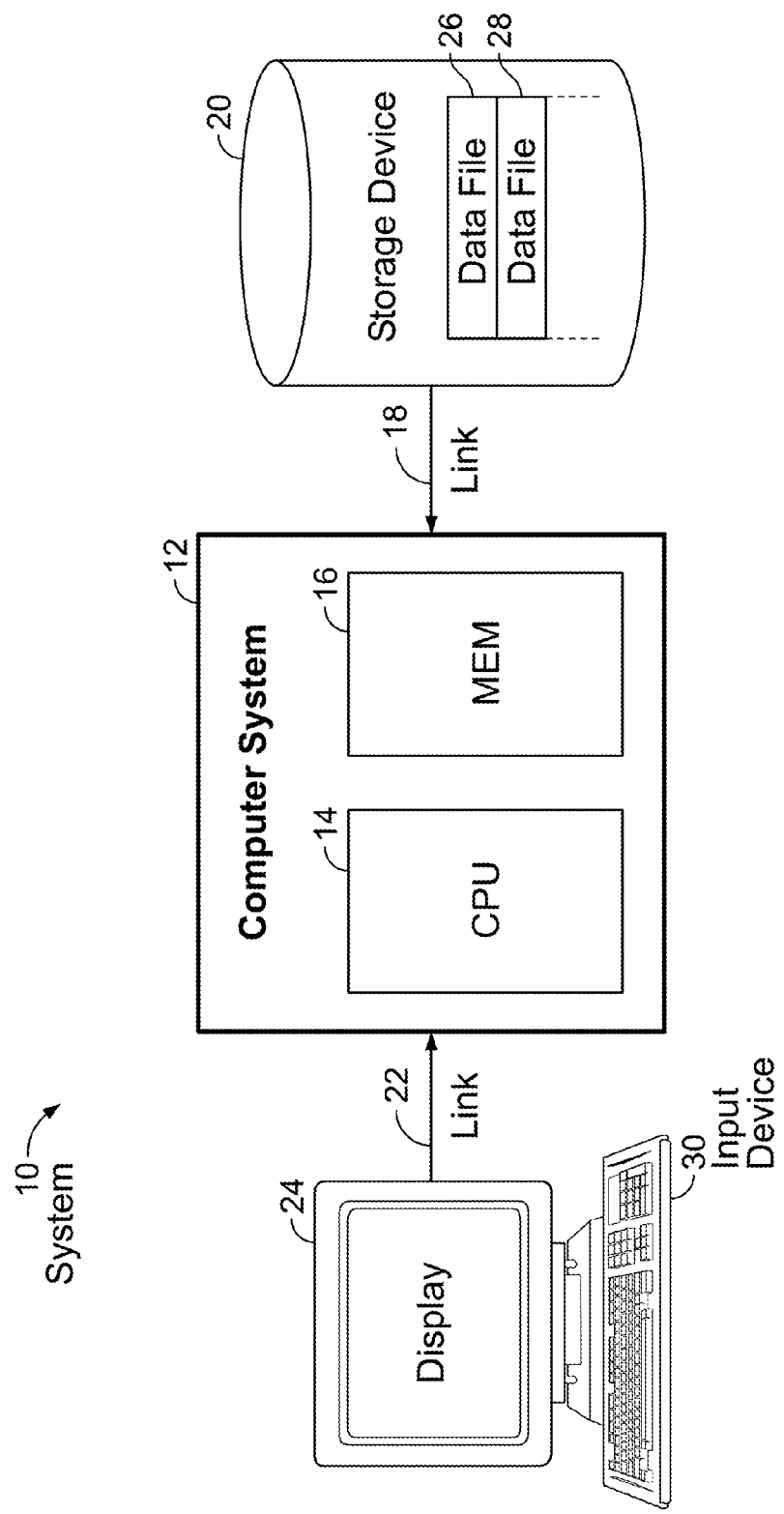
FIG. 1 is a block diagram of a computer system storing a poetry generation process.

Referring to FIG. 1, a computer system 10 for generating poetry includes at least a central processing unit (CPU) 14, a memory 16 containing a poetry generation process (not shown), a link 18 to a storage device 20, and a link 22 to a display unit 24. The storage device 20 may contain one or more data files 26 and 28. The display unit 24 also includes an input device 30, such as a keyboard and mouse, for example. The memory 16 includes a windows-based operating system (not shown), such as Microsoft Windows or Linux with Xfree Windows, for example, and a word processing program (not shown), such as Microsoft Word or Corel WordPerfect, for example.

In a particular embodiment, the operating system is Windows 95 and the computer system 10 includes Microsoft Word95, both from Microsoft Corporation of Redman, Wash. Further, the computer system 10 includes a minimum of four megabytes of random access memory (RAM) and twenty megabytes of storage space on the storage device 20.

Figure 2:
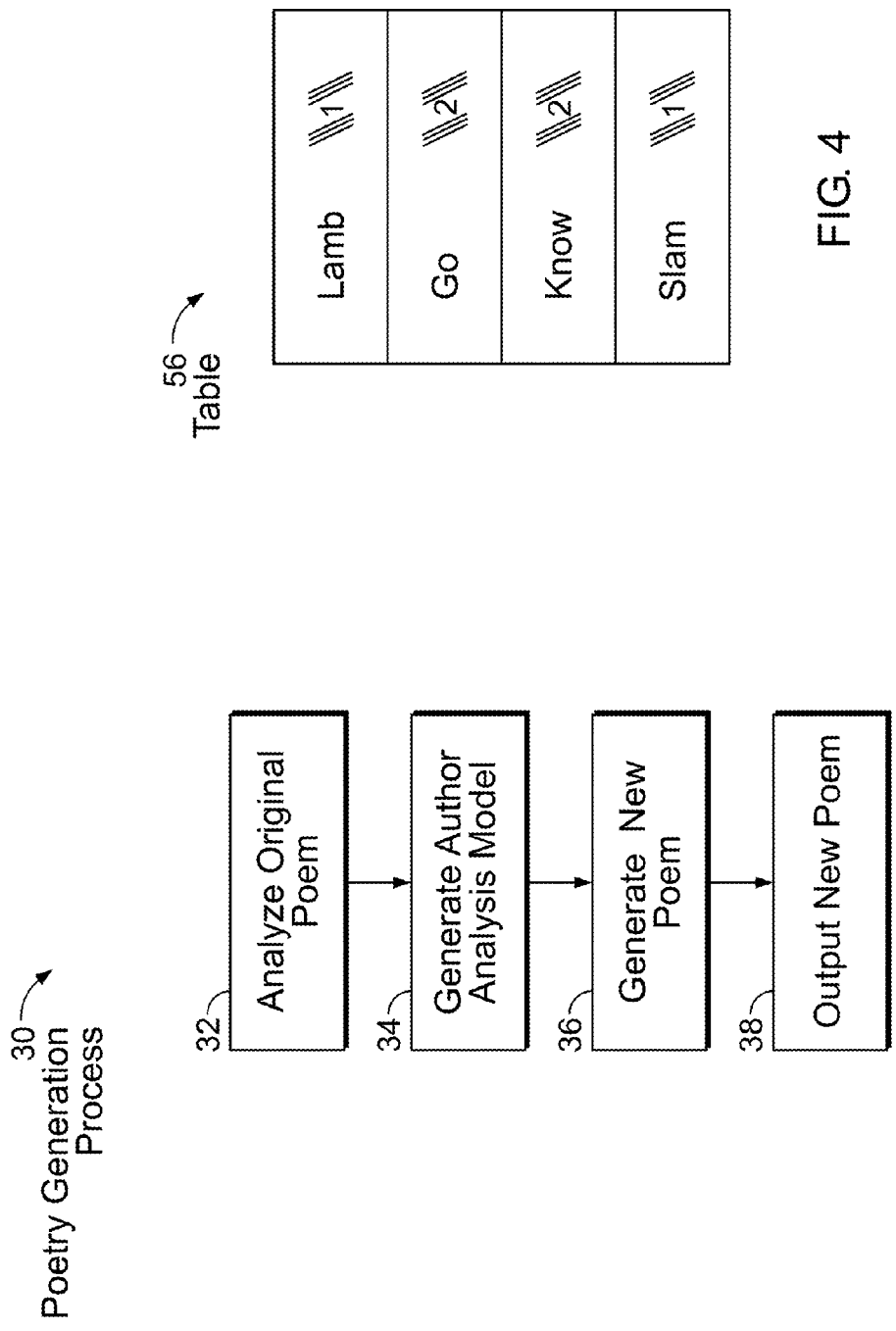
FIG. 2 is a flow diagram of a poetry generation process using the system of FIG. 1.

Referring to FIG. 2, a poetry generation process 30 analyzes 32 an original poem and generates 34 an author analysis model. New poems are automatically generated 36 in conjunction with the author analysis model and/or in response to user input. The new poetry is outputted 38 to a display, printed or stored on a storage device.

Figure 3:
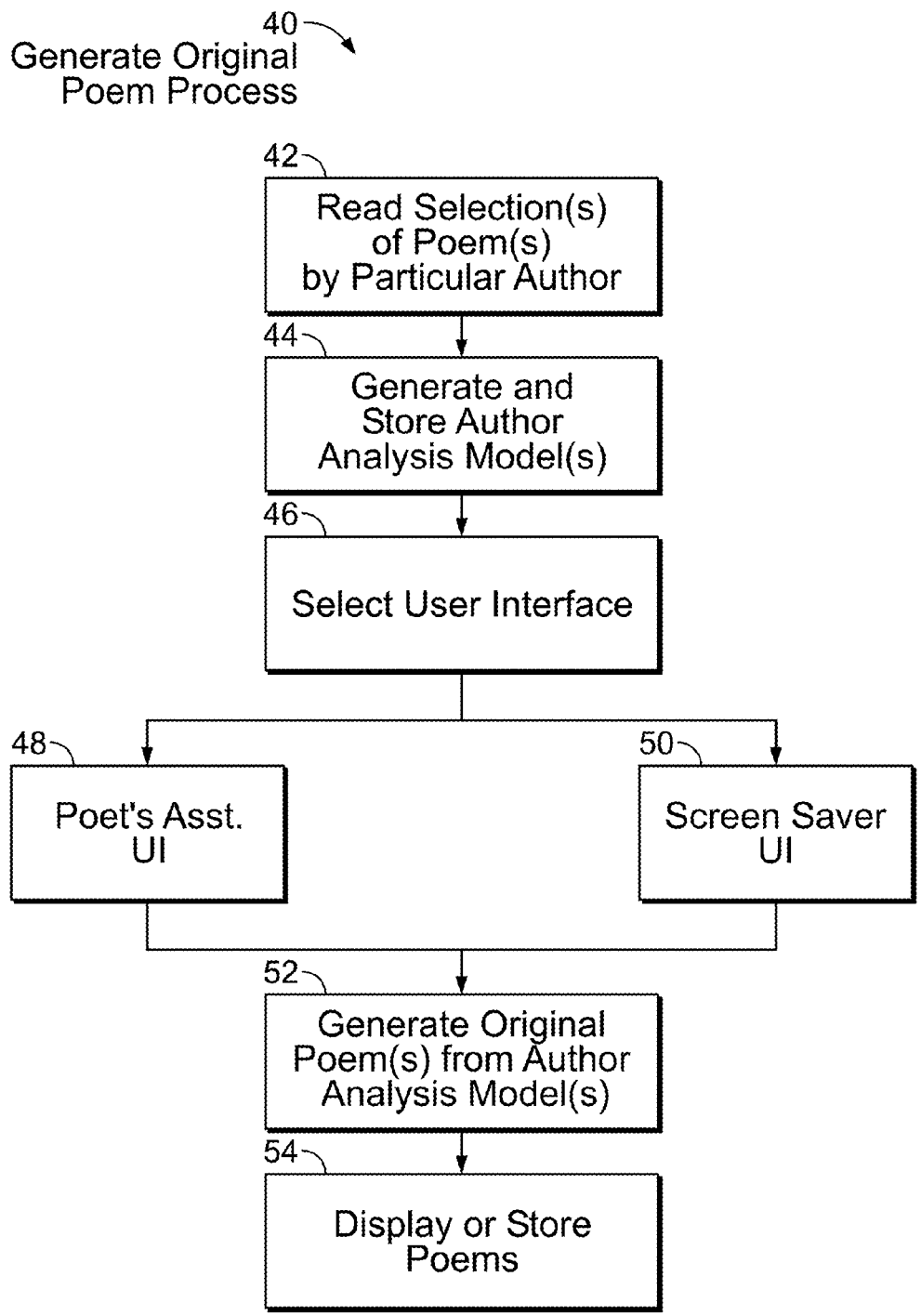
FIG. 3 is a flow diagram of a poem generation process using the system of FIG. 1.

Referring to FIG. 3, a process 40 to generate an original poem includes scanning 42 selections of poems by an author. The poems scanned are used to generate and store 44 an author analysis model. A user selects 46 an interface, specifically, a poetic assistant interface 48 and/or a screen saver interface 50. The process generates 52 an original poem(s) from the author analysis model. The original poem(s) is displayed 54 on the display unit, or stored on a suitable storage medium. The poem will have a similar style to the poem(s) originally analyzed and contained in the author analysis model, but will be original poetry generated by the process 30 (of FIG. 2).

The process 40 (of FIG. 3) may combine authors by generating poet personalities using multiple author analysis models. A poet personality also includes a set of parameters that control certain aspects of the poetry generation process. Thus, there can be a combination of author analysis models in a single poet personality.

As indicated above, selections of poems by an author are scanned by the process 40 to generate an author analysis model. The selection of poems typically includes an input file of poems with titles of a particular author. In a particular embodiment, poems to be analyzed are contained in an ASCII text file that contains one poem after another. Each poem contains a title, a blank line, the poem on multiple lines, with one blank line between stanzas, and another blank line. At the end of the poems a terminal line containing only "******" may optionally be placed. However, the process will stop reading the input poem(s) at the end of the ASCII text file.

Rhyme words are marked with a rhyme number during initial processing of the ASCII text, i.e., words which rhyme with each other, are specified in the author analysis model by the characters "\\\number\\\", where number is an integer with no commas, e.g., \\\4\\\. Words that rhyme with each other would have the same number, generally referred to as rhyme numbers, and thus be a member of the same rhyme set. Rhyme words are expected only at the end of a line and the rhyme number typically starts over with each stanza.

Referring to FIG. 4, a table having words and their associated rhyme numbering is shown for the poem "why go slam, know the lamb." The words "lamb" and "slam" are both numbered \\\1\\\ since they rhyme with each other and are placed in a first rhyme set, while "go" and "know" are numbered \\\2\\\ since they rhyme with each other, and not with "lamb" and "slam," and thus are numbered to indicate membership in a second rhyme set. The resulting poem is: why go \\\2\\\slam\\\1\\\, know \\\2\\\ the lamb \\\1\\\.

Once marked with rhyme numbers, the text is further analyzed to generate a linked data structure that specifies all n-grams found in the text, where $2<=n<=4$. Ngrams are sequences of n consecutive characters in a document. Ngrams are generated from a document by sliding a "window" of n characters wide across the document's text, moving it one character at a time. Thus, the word "testing" would generate the penta-grams "testi" "estin" and "sting". In addition, all text may be converted to a single case and non-alphabetic characters may be turned into spaces. After these transformations, sequences of consecutive blanks are compressed into a single space. The linked data structure (also referred to as an n-gram data structure) is stored in a data file located on a suitable storage unit as an author analysis model.

The end of line (EOL), end of poem (EOP), beginning of line (BOL), and beginning of poem (BOP) are considered special characters. In a particular embodiment, each stanza is considered to be a poem. There is no difference between the end of a stanza in an input set of poems to be analyzed and the end of the last stanza in a poem. In one embodiment, the process writes one stanza poems. For other embodiments the process may write multiple stanza poems. Thus, for any user input word the process can access a linked data structure from the data file of author analysis models and determine all of the words that followed that user input word in the author analysis model, along with a count for that bigram.

Punctuation also is attached to the word it abuts. For example, "house" differs from "house," or "house!". For any pair of user input words the process can access linked data structure from the data file of author analysis models and determine all of the words that followed that word in the author analysis model along with a count for that trigram. For any triple grouping of user input words, the process can access a linked data structure and determine all the words that followed that word in the author analysis model with a count for that quadrigram. In a particular embodiment, a word hash table allows looking up a word in the author analysis model and quickly determining a pointer into linked data structure.

Thus, for each word, line, and stanza analyzed from an author, its corresponding linked data structure is generated and includes at least the following elements:
 (1) Pointer to a word
 (2) Number of characters in the word
 (3) Count for this n-gram
 (4) Pointer to the next structure in the chain
 (5) Pointer to first structure at level n+1
 (6) Number of structures at level n+1

In a preferred embodiment, the above linked data structure elements are the following data types using the C language:
ngram DEFTYPE struct
 (1) *CHAR
 (2) BYTE
 (3) SHORT
 (4) *ngram
 (5) *ngram
 (6) SHORT Other data definitions preferably included in the ngram structure are the following, with their C language data type following:

| | |
|---|---|
| *gram | Pointer to first structure |
| *gram | Pointer to last structure assigned |
| SHORT | Number of structures assigned |
| n1_gram | pointer to the first word in the ngram structures during decoding |
| n2_gram | pointer to the second word in the ngram structures during decoding |
| n3_gram | pointer to the third word in the ngram structures during decoding |
| n4_gram | pointer to the fourth word in the ngram structures during decoding |
| hash_0 | pointer to the first entry in the hash table for words, entries are addresses which point to the first character of a word. |
| hash_size | number of entries allocated in word hash table |
| hash_assign_n | number of entries assigned in word hash table |
| hash_word_n | pointer to first entry in associated hash table which contains the size of each word |
| rhyme_hash_0 | pointer to first entry in the hash table for rhyme words |
| rhyme_hash_size | number of entries allocated in rhyme hash table |
| rhyme_hash_n | pointer to first entry in the associated rhyme hash table which contains the size of each word |
| current_rhyme_target | pointer to current rhyme target word in ngram structures |
| time_limit_1 | time limit for first phase of recursive line generation |
| time_limit_2 | time limit for second phase of recursive line generation |
| time_limit_3 | time limit for third phase of recursive line generation |
| time_limit_4 | time limit for fourth phase of recursive line generation |
| author_weight | weight of an author within a poet personality |
| ngram_2_count | bigram count for a word for which a score is being computed |
| ngram_2_weight | weight for the bigram for this author within this poet personality |

-continued

| | |
|---|---|
| ngram_2_exponent | exponent for the bigram count for this author within this poet personality |
| ngram_3_count | trigram count for a word for which a score is being computed |
| ngram_3_weight | weight for the trigram for this author within this poet personality |
| ngram_3_exponent | exponent for the trigram count for this author within this poet personality |
| ngram_4_count | quadrigram count for a word for which a score is being computed |
| ngram_4_weight | weight for the quadrigram ram for this author within this poet personality |
| ngram_4_exponent | exponent for the quadrigram count for this author within this poet personality |

Figure 5:
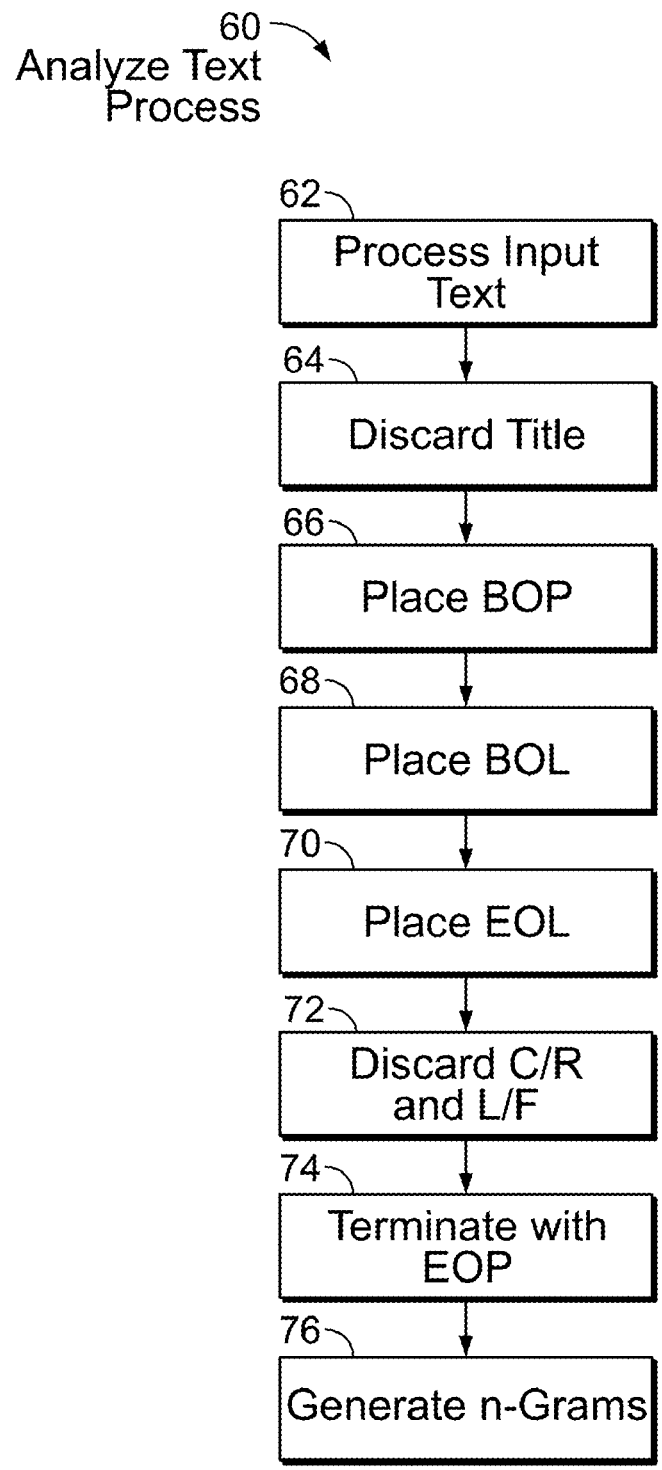
FIG. 5 is a flow diagram of the process used to analyze text.

Referring to FIG. 5, a process 60 used to analyze text includes generating an n-gram by processing 62 input text, such as ASCII text stored in an input file. Lines containing a title are ignored and discarded 64. A first word in the text under analysis has a special character (BOP) placed 66 in front of the first character. The last word in the poem has a special character (EOP) placed 68 after a last character of the word. The first word in each line has a special character (BOL) placed 70 in front of the first character. The last word in each line has a special character (EOL) placed 72 after the last character of the word. Carriage return and linefeed characters are discarded 74. All punctuation associated with the word is treated like any other character. Each stanza is treated as a separate poem, and the last word of the stanza is an end-of-poem word and is terminated 76 with the (EOP) character. The process 60 generates 76 a linked data structure for the text. The linked data structure includes 1-grams, bigrams, trigrams, and quadrigrams in both a forward and backward direction. As mentioned above, for any subsequent user input word, the process 60 can locate the user input word in the linked data structure and determine words that follow it in the link structure. The process 60 may also "back up" one word in the linked data structure, if needed.

Figure 6:
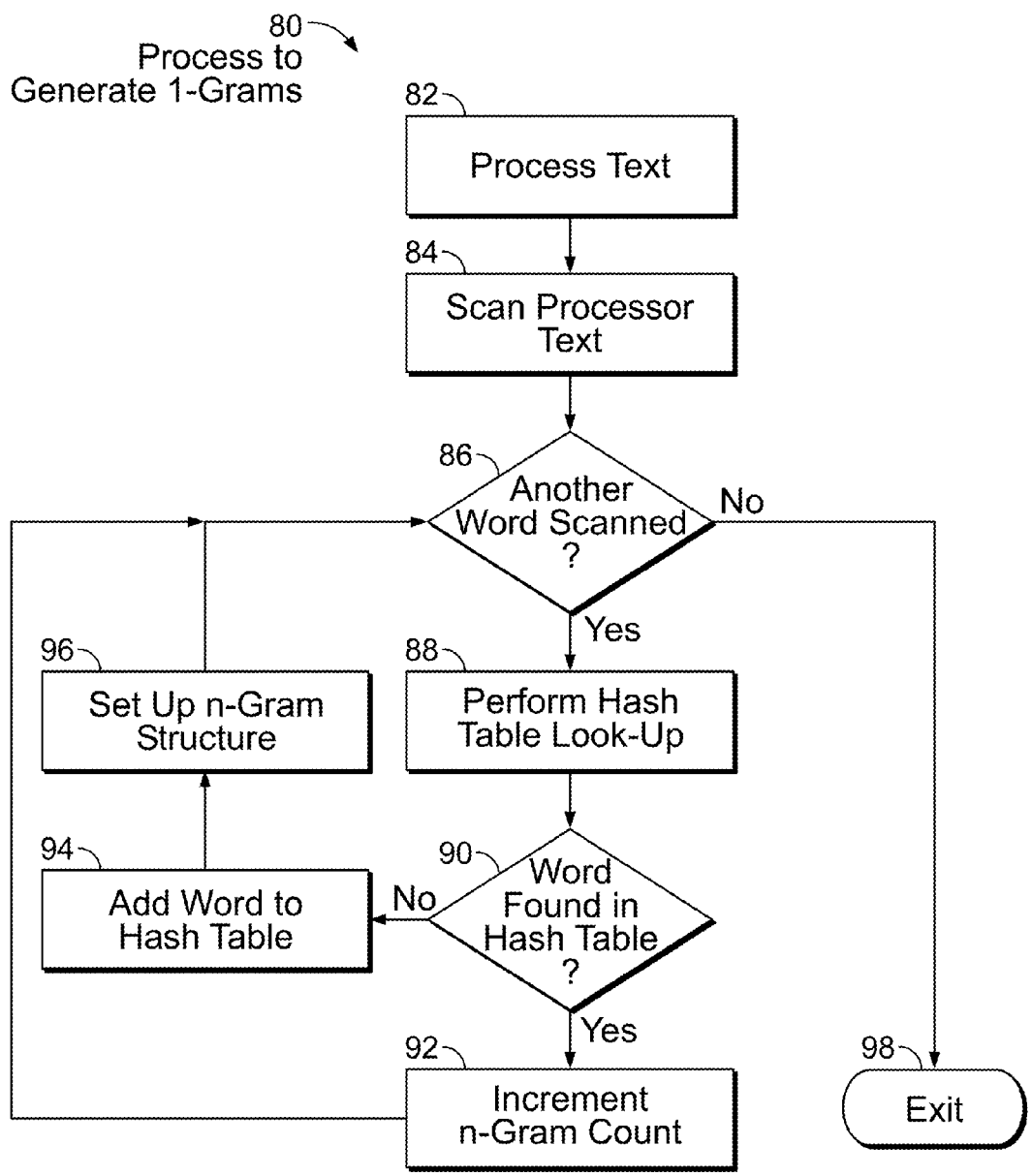
FIG. 6 is a flow diagram of the generation of 1-grams used by the process of FIG. 3.

Referring now to FIG. 6, the process 80 used to generate the 1-grams from the processed text of FIG. 5 includes feeding 82 the processed text and scanning 84 the processed text word by word. The process determines 86 whether a word has been scanned. For each word scanned, a look-up is performed 88 on a word hash table. A determination 90 is made as to whether the word was found in the word hash table.

If the word is found in the word hash table, the appropriate count in the link structure (ngram structure) for the word is incremented 92 and the process checks 86 whether another word was scanned. The count indicates a number of occurrences of the word in the link structure. If the word is not found in the word hash table, the word is added 94 to the word hash table and a hash assign number is associated with the word. The process 80 sets up 96 1-gram in the n-gram structure for the word. The ngram structure will include at least an address of the first character of the word, the number of characters in the word, and a count equal to one. All of the 1-gram words will be in a chain in the ngram structure. The process 80 then checks 86 whether another word was scanned. If not, the process 80 exits 98.

Figure 7:
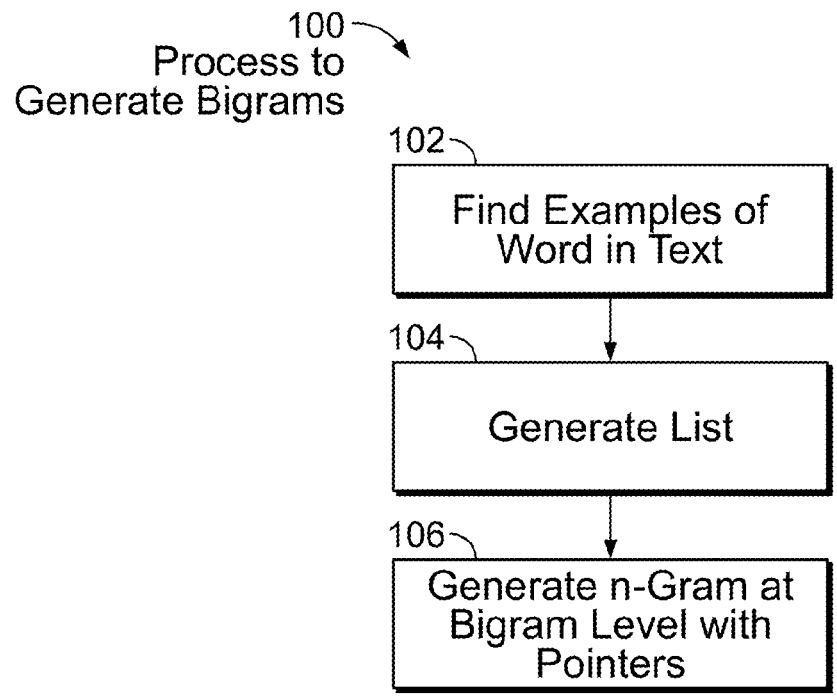
FIG. 7 is a flow diagram of the generation of bigrams used by the process of FIG. 3.

Referring to FIG. 7, a process 100 used to generate bigrams includes, for each 1-gram in a linked data structure, all examples of the word in the scanned text are found 102. A list of words that follow the word being scanned, along with associated counts, is generated 104 for each word. For each following word, an ngram structure at the bigram level with appropriate pointers is generated 106. The ngram structure at the bigram level will include at least an address of the first character of the second word in the bigram, the number of characters in the word being scanned, a count equal to one, and an address of next bigram for the word being scanned to provide a chain of words.

To generate a trigram, the process assumes that all of the 1-gram words will be in a chain in the ngram structures. Each 1-gram in the linked data structure is processed and, all of the bigrams for that word are scanned.

Figure 8:
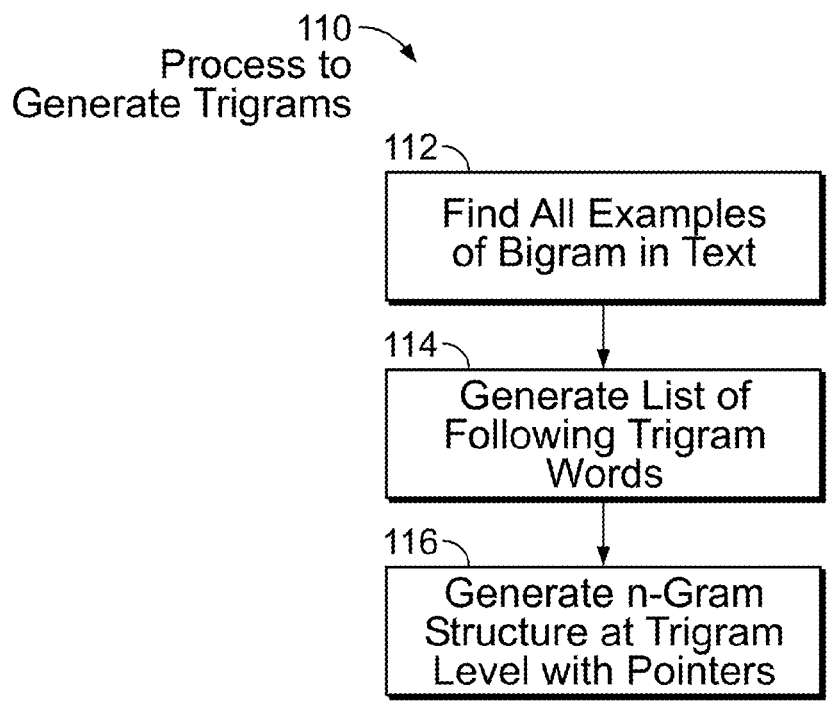
FIG. 8 is a flow diagram of the generation of trigrams used by the process of FIG. 3.

Referring now to FIG. 8, a process 110 used to generate trigrams determines 112 all examples of the bigram in the text. A list of all words that follow the bigram with counts for each trigrams word is generated 114. For each trigram, an ngram structure at the trigram level with the appropriate pointers is generated 116. The appropriate link structure for each trigram includes at least the address of the first character of the third word in the trigram, the number of characters in the word, count set equal to zero, and an address of a next trigram for the word under analysis, to generate a chain of trigrams for the word being scanned.

To generate a quadrigram, the process 100 assumes of the 1-gram words are in a chain of words in the ngram structures.

Each word in the chain is processed. For each word, all of the bigrams for that word are scanned. For each bigram, all of the trigrams for the word under analysis are scanned.

Figure 9:
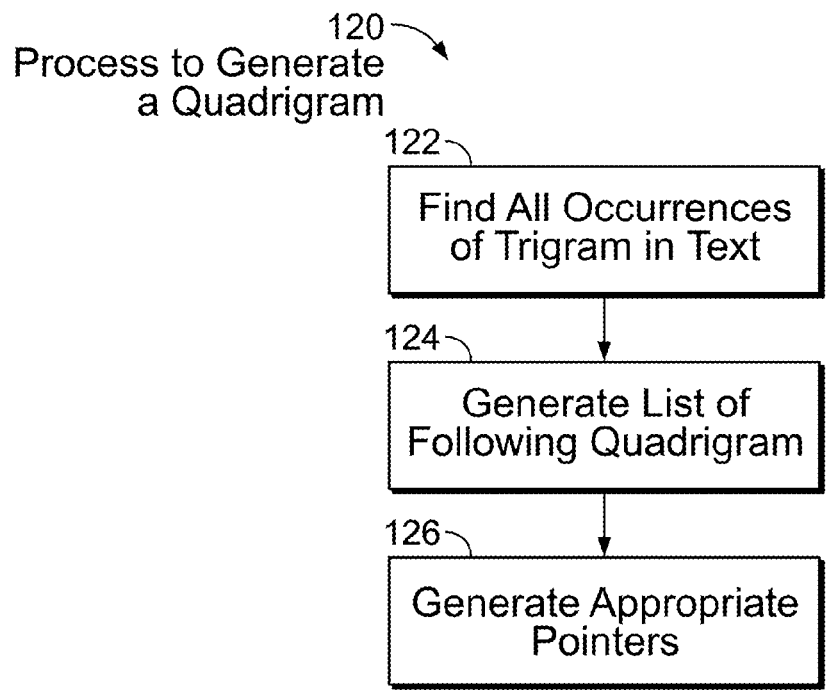
FIG. 9 is a flow diagram of the generation of quadrigrams used by the process of FIG. 3.

Referring now to FIG. 9, a process 120 used to generate a quadrigram locates 122 all occurrences of the trigram in the text being processed. A list of all words following the associated trigram with counts for each scanned word is generated 124. For each quadrigram, an ngram structure at the quadrigram level with the appropriate pointers is generated 126. The link structure contains at least an address of the first character of the fourth word in the quadrigram, the number of characters in the fourth word, a count equal to one, and the address of a next quadrigram for the word under analysis to generate a chain of quadrigrams for the word being scanned.

In an alternate embodiment, instead of first processing all 1-grams, then all bigrams, then all trigrams and then all quadrigrams, the process may generate all the 1-grams, bigrams, trigrams and quadrigrams for a particular word, then go to the next word, and so on, until all words are processed.

As mentioned above, a backward ngram analysis is also performed unless there are no rhyme words (indicated by the absence of rhyme numbers). The backwards ngram structures (with 1-grams, bigrams, trigrams and quadrigrams with the words in reverse) is used for various stages in a recursive process to generate lines that match a rhythm and rhyme criteria fully described below.

An input to a rhyme analysis utility is a set of poems with the rhyme word sets indicated, as discussed above. A user can convert a set of poems without rhyme word sets indicated to one with the rhyme word sets indicated, using the rhyme analysis utility.

The output of the rhyme analysis utility is a set of ngram structures similar to bigrams. Instead of bigrams, however, the word pairs indicate word rhyme pairs.

For a rhyme pair "a" and "b", both "a" followed by "b" and "b" followed by "a" are put in as rhyme "bigrams".

For rhyme sets of more than two words, all combinations are generated. Thus, by way of example, if "spin", "begin" and "within" were a three word rhyme set, then all of the following six rhyme "bigrams" would be put into ngram structures:

spin begin
begin spin
spin within
within spin
begin within
within begin

The rhythm and rhyme structures found in the poems are also analyzed and saved by the process. A rhythm/rhyme structure of "20 a b b a" signifies that the lines have an average of 20 syllables, and the rhyme pattern is the last word of the first line rhymes with the last word of the fourth line, the last word of the second line rhymes with the last word of the third line, and so forth.

The number of syllables in a word is determined by the process as a mapping of the number of characters, based on a set of parameters, and therefore, the number of syllables is only an estimate.

There are three forms of output from the rhyme analysis utility:
1. printing of all rhyme pairs
2. printing of all words on a line which all rhyme with each other.
3. printing of the rhythm and rhyme structures found in the analyzed poems.

In summary, the process 30 (of FIG. 2) generates and stores a series of data structures for an author's poem in a data file. Each author poem has a data file containing linked data structures representing rhyme sets and words that precede and follow each individual word of each individual poem, i.e., 1-grams, bigrams, trigrams and quadrigrams. This datafile is used by the process to generate original poetry that may rhyme or not. As a user inputs a word via a word processing program, the process locates the user word in an appropriate author analysis model. Once the word is located in the author analysis model, the process 30 can generate a next word, can complete a line, and/or can complete a poem by looking at the 1-grams, bigrams, trigrams and quadrigrams for the user word.

Figure 10:
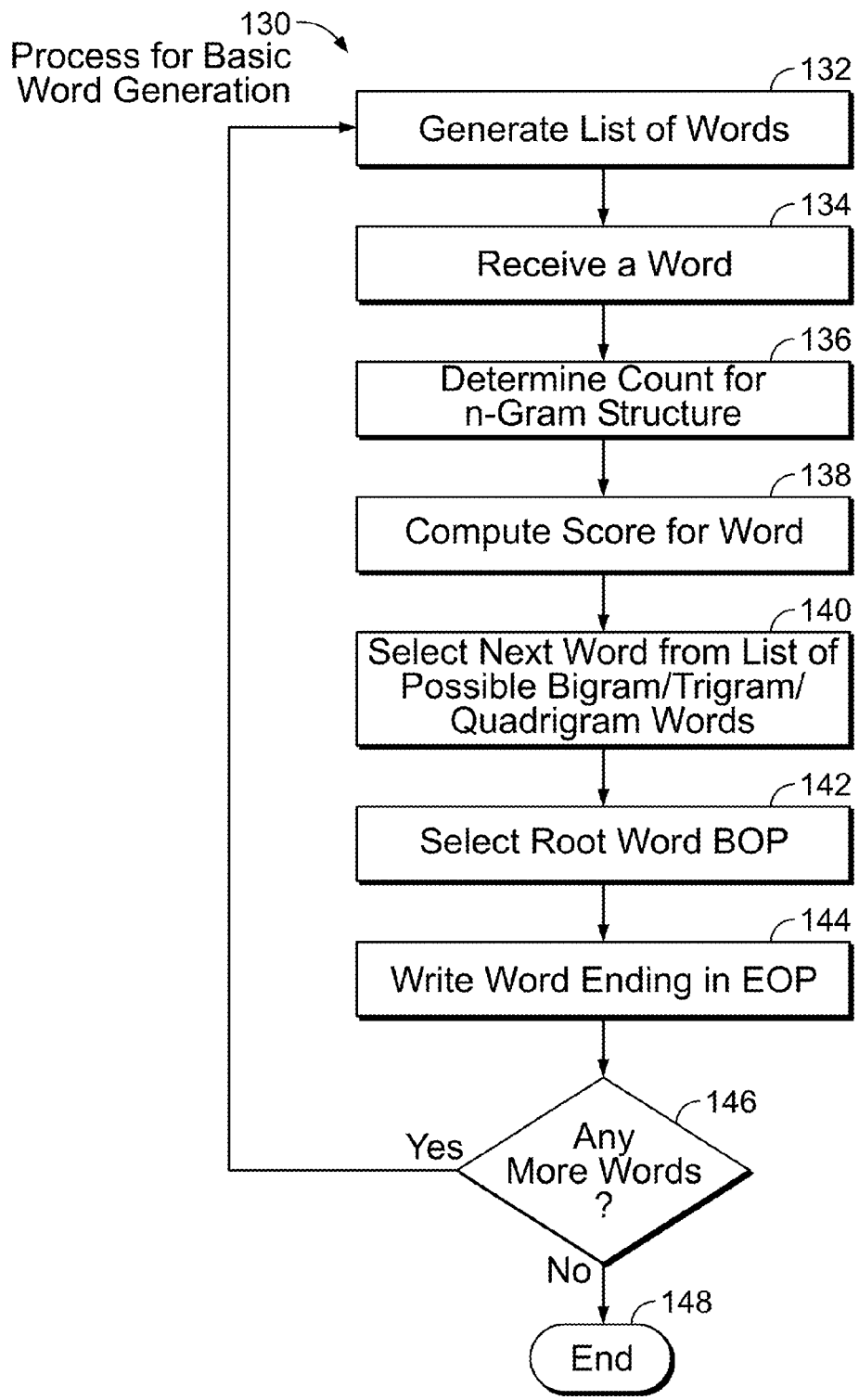
FIG. 10 is a flow diagram of the generation of words used by the process of FIG. 3.

Referring now to FIG. 10, a process 130 used for basic word generation includes generating 132 a list of words that follow the last word written by a user or automatically by the process and saved in memory, providing a user linked data structure. Pointers to user n-gram data structure generated for a new original poem, described below, are continually updated, so that the pointer for the current bigram becomes a pointer to the current trigram once a word is written by the user or process.

A new word is received 134 from the user (e.g., via keyword input in a word processing program) or randomly generated by the process from an author analysis model. A count is determined 136 for the user n-gram structure being assembled (i.e., 1-gram, bigram, trigram and quadrigram) and stored in memory for the new poem. A score is computed 138 for each new word input by the user. A bigram count is raised to the bigram_exponent_parameter power and multiplied by the bigram_weight. The trigram count is raised to the trigram_exponent_parameter power and multiplied by the trigram_weight. The quadrigram count is raised to the quadrigram_exponent_parameter power and multiplied by the quadrigram_weight. These three values are added together to form the score for that word. Thus, $$score = author\_weight * (ngram\_2\_weight * (ngram\_2\_count^{**} ngram\_2\_exponent) + (ngram\_3\_weight * (ngram\_3\_count^{**} ngram\_3\_exponent) + (ngram\_4\_weight * (ngram\_4\_count^{**} ngram\_4\_exponent))$$

If there is more than one author analysis model in a poet personality being used by the user in generating the new poem, described below, then the score is the sum of the scores achieved for each author analysis model selected by the user and contained in the poet personality. The parameters author_weight, ngram_2_weight, ngram_2_exponent, ngram_3_weight, ngram_3_exponent, ngram_4_weight, and ngram_4_exponent are different for each author in a poet personality.

A poet personality contains one or more author analysis models and is under user control. If the poet personality contains more than one author analysis model, each of the link structures contained in each author analysis model are used by the process to generate new words, lines and stanzas for the user. Each author analysis model within a poet personality has its own set of bigram, trigram and quadrigram exponent and weight parameters. There is also an overall parameter providing weight for each author analysis model (author_weight) within a poet personality, which also can be user selected.

After the user inputs a word, the process uses a random number generator to choose 140, a next word from a list of possible bigram/trigram/quadrigram words found in the author analysis model(s) within the poet personality, with each process provided word given a probability of being selected proportional to its score. A root "word" (BOP) is selected 142 which has bigrams to words in the author analysis model that start with the BOP special character. A word is then written 144 by the process that ends with the special character EOP. The process determines 146 whether there is another word inputted by the user. If not, the process ends 148. If there is another word, the process begins again 132.

Using the basic word generation process described above with reference to FIG. 10, the process 130 may write a poem without rhythm and rhyme structure (i.e., ignoring rhyme numbers) and with rhythm and rhyme structure (i.e., considering rhyme numbers).

Figure 11:
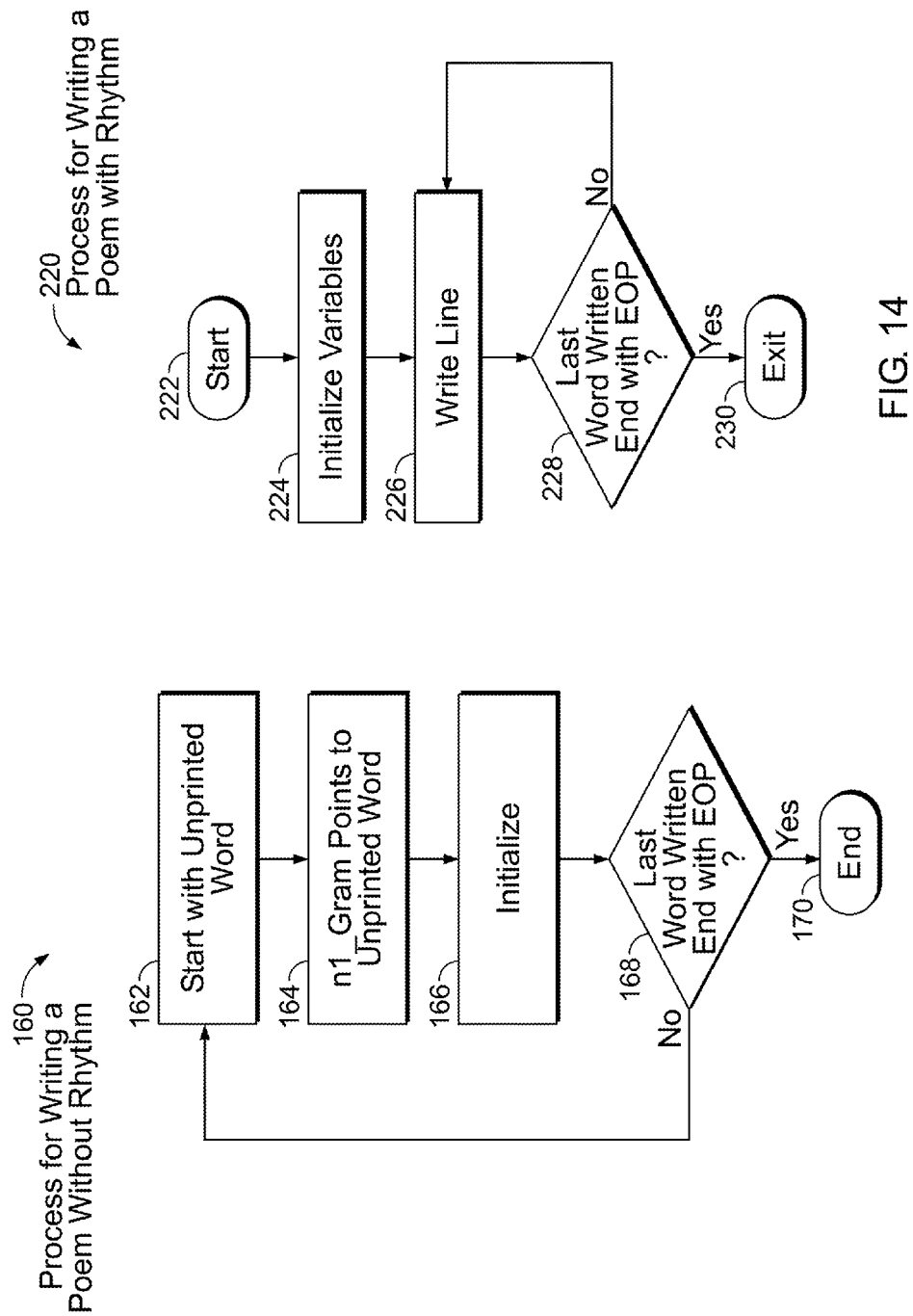
FIG. 11 is a flow diagram of the generation of a poem without rhythm and rhyme structure used by the process of FIG. 3.

Referring now to FIG. 11, a process 160 for writing a poem without rhythm and rhythm structure begins with Beginning of Poem (BOP) that points to words that start with the End of Poem (EOP) special character 162. The process continues where n1_gram points 164 to this first printed word. The variables n2_gram, n3_gram, and n4_gram are initialized 166 to zero. The process loops back to 172 to recursively begin again. If the last word written ends with the End of Poem (EOP) special character 168 the process ends at 170. Otherwise, the process loops back 162.

Writing a poem with rhythm and rhyme structure involves recursive generation of each line to achieve rhyme and rhythm.

As described above, a poem maybe generated simply by starting with (EOP) and generating words using the basic word generation process of FIG. 10 until a word ending in (EOP) is generated.

A poem may optionally have a rhythm and rhyme structure.

A rhythm structure specifies a target length for the line as a number of syllables. In a particular embodiment, the process does not use a dictionary specifying the number of syllables in each word. Instead, a simple look-up table is used to map the number of characters in a word to the number of syllables.

A target length for a line is the number of syllables specified by the rhythm structure plus or minus a fraction of that length specified by a parameter.

The rhyme structure specifies the pattern of rhyme words, as well as the number of lines.

For example, a poem may specify 20 syllables and a rhyme structure of: "1,1,2,2,3,3,4,4".

This means there are eight lines and the last word in line 1 rhymes with the last word in line 2, the last word in line 3 rhymes with the last word in line 4, the last word in line 5 rhymes with the last word in line 6, and the last word in line 7 rhymes with the last word in line 8.

If a rhyme structure was 1,2,2,1,3,4,4,3, then the last word of the first line rhymes with the last word of the fourth line, the last word of the second line rhymes with the last word of the third line, the last word of the fifth line rhymes with the last word of the eighth line, and the last word of the sixth line rhymes with the last word of the seventh line.

Rhythm and rhyme structures may be extracted from an author analysis model or specified by the user or designer.

A recursive generation process is used to generate lines provided by the basic word generation process described above with reference to FIG. 10, yet also follows the rhythm and rhyme structure. Using the recursive generation process, the process potentially tries every combination of valid word sequences (generated by the basic word generation process of FIG. 10) to find (the first) word that matches the rhythm structure (defined as a length in syllables, with the number of syllables in each word inferred from word length) and rhyme structure (defined as finding a line end word that is in a rhyme pair with a target rhyme word in a previous line, if any).

Each displaying and/or storing of a new poem involves the execution of three routines, i.e., a write word routine, a write line routine, and a write poem routine.

Figure 12:
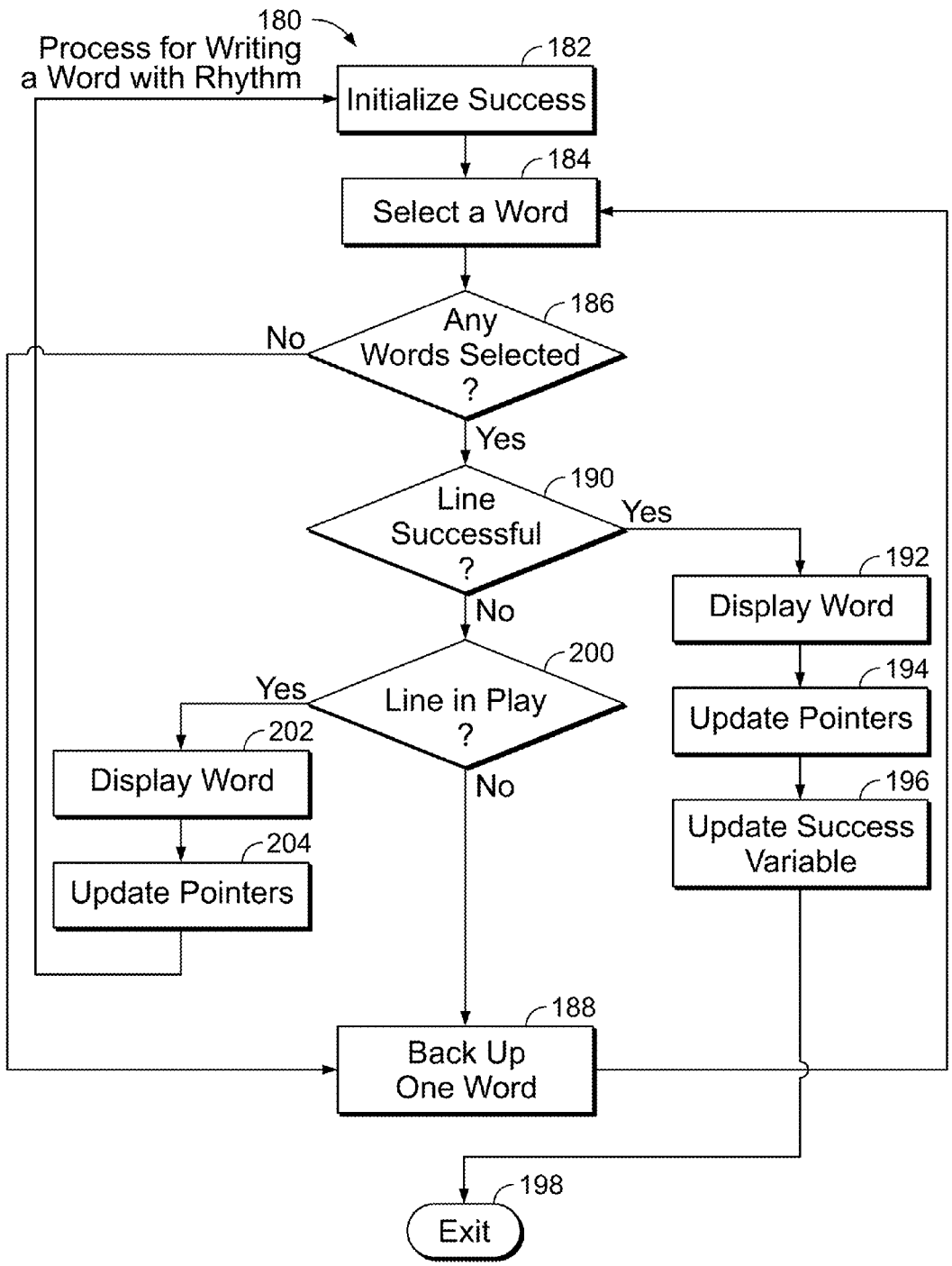
FIG. 12 is a flow diagram of the generation of a word with rhythm and rhyme structure used by the process of FIG. 3.

Referring to FIG. 12, a process 180 used for writing a word with rhythm and rhythm structure begins with initializing 182 an arbitrary success variable to zero. The word generation process of FIG. 10 is used to select 184 a word from an author analysis model that has not been selected yet. A determination 186 is made if there are no words that have already been selected in this loop that are remaining. If there are no words, the process backs up 188 one word in the author analysis model and then loops to select 184 a word. If there are words that have been selected, a determination 190 is made on whether the line is now "successful". Success is defined as being within the length range and having a proper rhyme word if a rhyme word is needed, or any word if no rhyme word is needed. If the word is successful, the word is displayed or stored 192. Updated pointers into the linked ngram structure are generated 194 for the dynamic user n-gram structure being used to represent the words being written by the process for the user. The success variable is then set equal to one 196 and the process exits 198. If the word is not successful, a determination 200 is made on whether the selected word is less than the maximum length and not having a proper rhyme word within the length range. The selected word is displayed 202 if it is less than the maximum length and does not have a proper rhyme word within the length range. The pointers into the user n-gram structure are updated 204 and the process initializes 182 the success variable to zero. If the selected word is greater than the maximum length and has the proper rhyme word within the length range, the process backs up one word 188 in the other analysis model.

Figure 13:
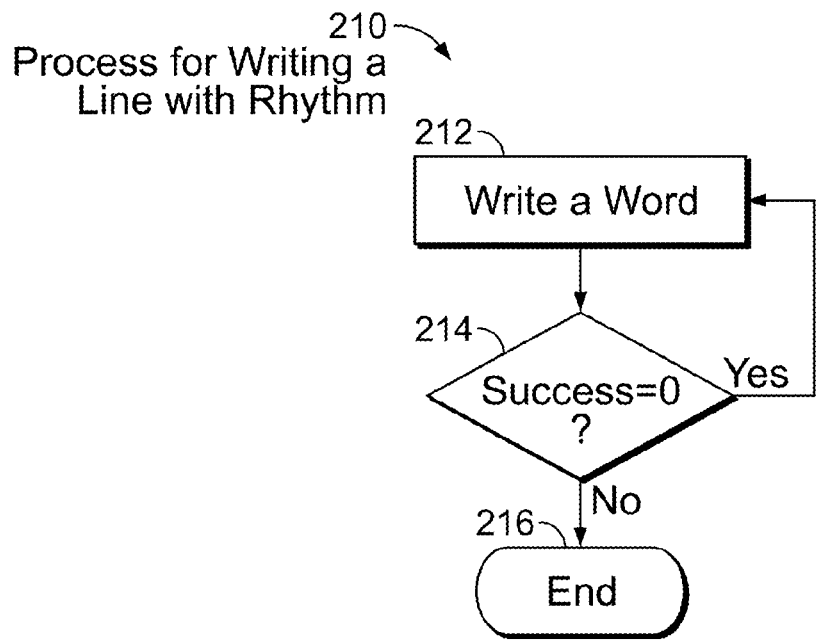
FIG. 13 is a flow diagram of the generation of a line with rhythm and rhyme structure used by the process of FIG. 3.

Referring to FIG. 13, a process 210 used for writing a line with rhythm and rhythm structure begins by writing 212 a word (in the method described in conjunction with FIG. 11). The process then determines 214 whether the success variable is set equal to zero. If the success variable is equal to zero, the process writes 212 a word obtained from the author analysis model. If the success variable is not one, the process exits at 216.

Referring to FIG. 14, a process 220 used for writing a poem with rhythm and rhythm structure starts 220 with the special character end of poem (EOP). A set of variables are initialized 224. More specifically, n1_gram points to EOP. N2_gram, n3_gram, n4_gram are all set equal to zero. The process writes 226 a line before the EOP. The process determines 228 if the last word written in the most recent line ends with the special character end of poem (EOP). If it does not, the process writes 226 a line. If the last word written does end with the special character end of poem (EOP), the process exits 230.

The above process 220 describes a forward recursive method to write a line using a Markov modeling based next-word generation process, and using a recursive method to generate all possible word combinations until an appropriate rhyme word is found (if any are required) within the appropriate length (rhythm) range. This recursive process may loop indefinitely, and thus a time limit is used. If this time limit is exceeded, then other strategies are used by the process which may "break" the link between the last word of the previous line and the first word of the current line. The following alternatives may be:

1. First try, the above forward recursive algorithm within a time limit (time_limit). If successful, the process is finished with the line;
2. If (1.) is not successful within time_limit_1, then try a backward process. Generate the line backwards, using a backwards link structure. The "first" word in the backwards line (which will become the last word) is the desired rhyme word. Generate the line backwards in the same recursive manner as (1.) above, until the last word in the backwards line (which will become the first word) is found that properly links up with the actual last word of the previous line. This process is tried within the time limit defined by time_limit_2;
3. If (2.) is not successful within time_limit_2, then try the backwards process again, but the last word in the backwards line (which will become the first word in the line) may be any start-line word (i.e., any word that begins with the character (BOL)), not necessarily one that links to the actual last word of the previous line. This process is tried within the time limit defined by time_limit_3; if 3 is not successful with time_limit_3, then try the backwards process again, but the word in the backwards line (which will become the first word in the line) may be any word, not necessarily one that starts with the character (BOL).

Referring back to FIG. 3, the user of the process 40 selects an interface 46. The user may select the screen saver interface 50. As a user "right clicks" on the desktop of the Windows 95 operating system user interface, a dialogue box appears. Choosing "properties," then "screen saver," then "poet screen," generates additional screen saver dialogue boxes that are used in conjunction with the computer generated computer system as described above.

In an embodiment, a primary screen saver dialogue contains one or more of the following information and options.

| | |
|---|---|
| Information on upgrade | A link to a dialogue box which contains further information including ordering |
| Basic screen saver options | Length of time to wait before initiating screen saver mode and which corner of the screen moving the mouse to will initiate screen saver mode |
| Select from available poet personalities | Activates the number chosen |
| Select order | Random or sequential |

-continued

| | |
|---|---|
| Color of poems | Random or selected |
| Background | Color |
| Font | Font color |
| Size | Font size |
| Save | Write to disk or not |
| Scrolling | Rate of scrolling |
| Random number generator | On or off |
| Control Scrolling | Stop or rate of scrolling |

The above choices may have default values. The choices also may require more than one dialogue box, in which case appropriate parameters would be grouped into a secondary box. Once the screen saver is activated, one poem after another scrolls by at a user controllable rate (controlled by a dialogue box parameter). The poems appear in a font, font size and color selected by the appropriate dialogue box parameters with the specified color.

Referring back to FIG. 3, the user may select the poet assistant user interface 50. An example of poet's assistant interface is shown in FIG. 16, described below. In a poet's assistant dialogue box within the word processing program, the user selects as many poet's assistant windows as desired. For each selected window, the user further chooses a poet personality, and a choice of 'next word display,' 'finish line display,' or 'finish poem display.' As will become apparent, a choice of next word display will provide a 'next word' after the user types a word in the word processing program, the choice of 'finish line' will provide a completed line after the user types a word in the word processing program, and the choice of 'finish poem' will provide a complete poem, i.e., one stanza, after the user types a word in the word processing program.

The poet's assistant dialogue box also includes a button to activate a 'define poet personality' dialogue box, described below, and an 'analyze author' dialogue box. In an embodiment, these two actions, i.e., define poet personality and analyze author, may be activated from a tools pull-down menu when the poet's assistant dialogue box is open or when the word processing program is open.

As previously mentioned, the user writes his/her poem(s) in a word processing program executing on Microsoft Windows95. Superimposed in Microsoft Word, for example, while the user is writing his/her poems are the multiple poet's assistant windows, as selected in the poet's assistant dialogue box. Each poet's assistant window starts out at a certain size, but can be moved and sized by the user as provided by the operating system.

Each poet's assistant window has a title indicating the name of the poet personality, the authors included in that poet personality, and an indication of whether it is a next word display, next line display, or finish poem display.

The process of the computer generated poetry system will write one word at a time in each of the windows, alternating between each of the windows. Once the visible portion of the windows is filled, process continues to write words to all of these poet's assistant's windows, so the user may scroll to view the additional text, as provided by the operating system.

The user can cut, copy and paste text from any of these poet's assistant windows to his or her poem in the Microsoft Word display, as provided by the operating system and the word processing program. Additionally, the user may write a word and query the process to provide a list of all the words that rhyme with that word as found in any of the author analysis models.

A "Define Poet Personality" dialogue box may be activated by a button in the Poet's Assistant Dialogue Box (or, alternatively, by selection of an item from a Tools menu).

A Poet Personality is based on the previous analysis of one or more authors and thus involves one or more author analysis models. The Define Poet Personality dialogue box prompts the user to select one or more authors from the list of authors that have been analyzed previously and for which author analysis models exist. The user is also prompted to give a personalized name to the Poet Personality.

For each author analysis model in the Poet Personality, the user can link to another dialogue box to provide poem generation parameters for that author analysis model within the Poet Personality. If the user does not link to this additional dialogue box, then default parameters are provided.

In an embodiment, these parameters are listed in the following table with their default values, if appropriate.

| | |
|---|---|
| Overall Weight for this Author | default = 1 |
| Weight of bigram original poet | default = 1 |
| Exponent of bigram original poet | default = 1. A high exponent will give higher priority to higher bigram counts. A bigram exponent =>3 or 4 will tend to give absolute priority to higher counts. An exponent of 1 will scale the probabilities equal to the relative counts. An exponent between 0 and 1 will give only soft priority to higher counts. Thus a high exponent will more closely follow the original author, but too high an exponent risks writing the same poem over and over. Negative exponents will actually give higher weight to lower counts and visa versa. |
| Weight of trigram original poet | default = 1 |
| Exponent of trigram original poet | default = 1 |
| Weight of quadrigram original poet | default = −100. The reason for a high negative weight for the quadrigram original poet is that we are using the quadrigram original poet as a plagiarism avoidance algorithm. A large positive weight on the quadrigram original poet would closely follow the original author, but would risk plagiarizing that author. A large negative weight prevents plagiarism. |
| Exponent of quadrigram original poet | default = 1 |
| Probability of using the rhythm/rhyme structures for this author | default = 1 |

A high exponent exaggerates the difference in counts. For example, an exponent of 2 means that a count of 1 stays 1, whereas a count of 2 becomes 4 and a count of 3 becomes 9. An exponent of 3 means that a count of 1 stays 1, whereas a count of 2 becomes 8 and a count of 3 becomes 27. In a particular embodiment, all parameters including exponents are floating point and can include fractions. Thus, a high exponent (4 or greater) would tend to make the higher counts usually "win". A very high exponent would mean that the highest count would win virtually all the time. The advantage of a high exponent is that it tends to select the words with the higher bigram or trigram counts, and thus follows more closely the word patterns found in the author analysis model.

It should also be noted that the generated poems would not plagiarize the poems of the original authors because of the high negative weight on the quadrigram original author analysis model which tends to act as an anti-plagiarism safeguard. The disadvantage of a high exponent is that the process will tend to always select the highest count and thus will be more likely to repeat itself. With a very high exponent, the process will tend to always write the same poem given the same start word. For this reason, the process does not use the parameters for the first word, but uses default parameters with weights and exponents=1. With a very high exponent, the process will tend to write the same poem for a particular start word, and thus will write as many different poems as there are start words, which would approximately equal the number of poems that were analyzed in the author analysis model. Thus a very high exponent would result in interesting poems, but a limited number of them.

The advantage of lower exponents (around 1) is that the number of poems is very large, but they will follow the original author somewhat less closely. An exponent of 1, however, will weight the probabilities in the same way that the original author did.

Exponents between 0 and 1 will emphasize higher counts only in a "soft" way, and will give only somewhat higher weight to higher counts. An exponent of 0 will ignore counts and will give all of the possible bigram and trigram words an equal weight regardless of their frequency in the author analysis model. However, the next word will still be limited to word sequences that did occur in the bigrams and trigrams of the author analysis model.

A negative exponent will give preference to lower counts. A high negative exponent will tend to give absolute priority to the lowest count, which is usually 1.

The bigram and trigram original poet weights provide the relative influence of these two original poets. The trigram original poet will tend to produce word sequences that more closely follow the original author, although again plagiarism is avoided as long as there is a strong negative weight on the quadrigram original poet.

A strong negative weight on the quadrigram original poet will avoid plagiarism (defined as four words in a row that match the original author), although if none of the possible bigram and trigram words avoids a four-long string from the author analysis model, then one of these words will be used even though that four-word sequence appeared in the author analysis model. Otherwise, the program would just have to halt, which is not desirable. Thus a strong negative weight on the quadrigram original poet avoids plagiarism unless it cannot be avoided in a particular situation, which would tend to be rare.

If one puts a strong positive weight on the quadrigram original poet and a high quadrigram exponent, then the process would tend to generate poems that matched the ones analyzed.

An Analyze Author dialogue box is activated by a button in the Poet's Assistant Dialogue Box (or, alternatively, by selection of an item from the tools menu), and is part of the operating system and associated word processing program.

The user specifies an input and output file. The input file contains poems in the appropriate format. The output file contains the analyzed model.

The user also specifies the name of the author (or some other description of the collection of poems/text being analyzed).

The dialogue box contains a button which activates the analysis.

It is preferred that the analysis should contain some progress indicator.

Another button activates an interactive utility that allows the user to specify rhyme words within a set of poems.

As indicated above, a name is specified for the poet personality.

For each poet personality (which can include multiple author analysis models), a number of authors may be specified. For each author within a poet personality, there are the following parameters with their C language data types:

| Identity of author file | STRING | User input |
|---|---|---|
| author_weight | DOUBLE | weight of an author within a poet personality |
| Ngram_2_weight | DOUBLE | weight for the bigram for this author within this poet personality |
| Ngram_2_exponent | DOUBLE | exponent for the bigram count for this author within this poet personality |
| Ngram_3_weight | DOUBLE | weight for this trigram for this author within this poet personality |
| Ngram_3_exponent | DOUBLE | exponent for the trigram count for this author within this poet personality |
| Ngram_4_weight | DOUBLE | weight for the quadrigram ram for this author within this poet personality |
| Ngram_4_exponent | DOUBLE | exponent for the quadrigram count for this author within this poet personality |

Thus, in poet's assistance mode, the user is writing his or her own poem using a suitable word processing program. The process monitors what the user is writing. The process displays a number of windows that provide suggestions to the user to help stimulate the user's imagination. Each window is associated with a particular poet personality, that is defined by one or more author analysis models plus a set of poetry generation parameters for each author analysis model described above.

Figure 15:
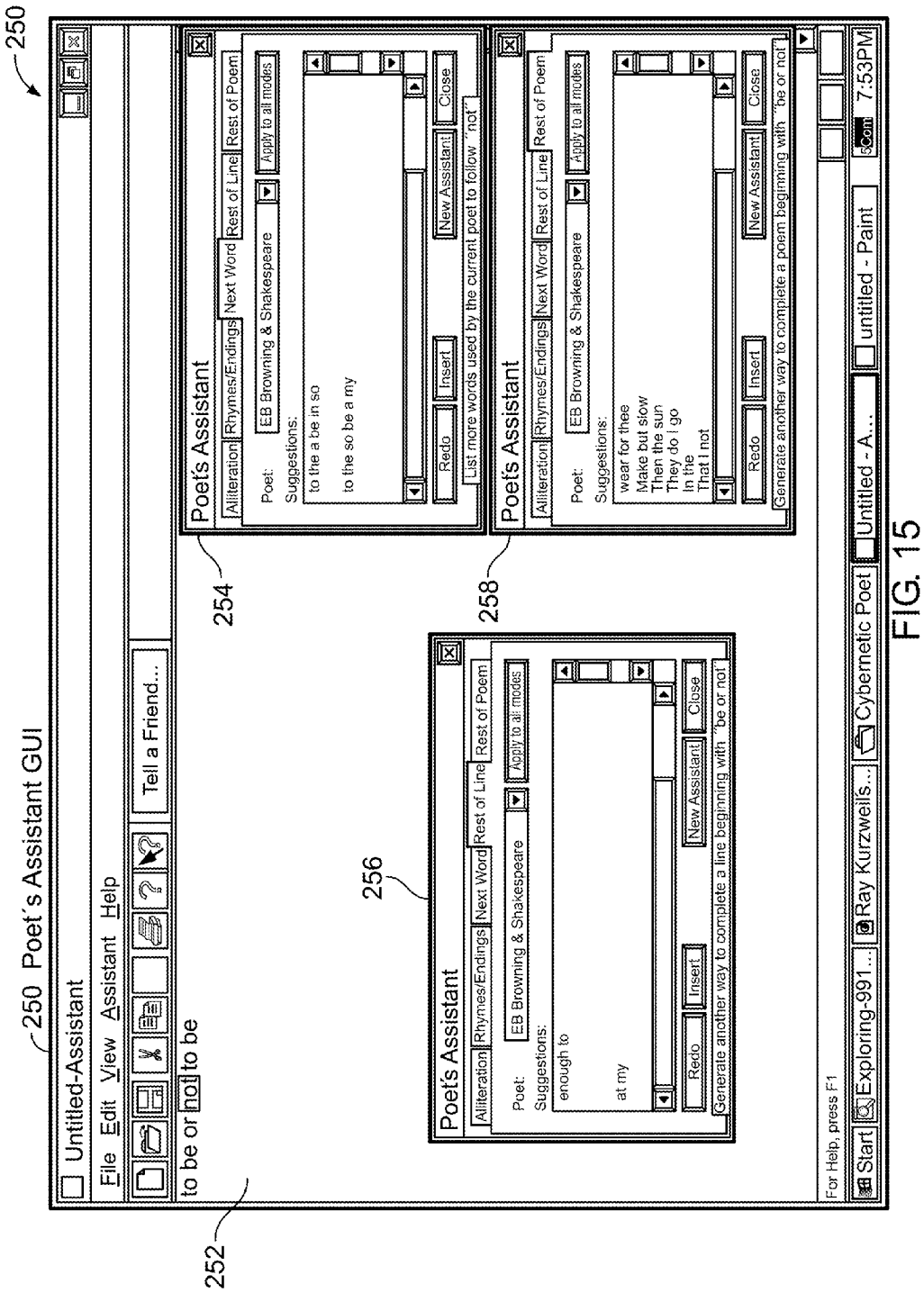
FIG. 15 is a diagram of an exemplary poet's assistant graphical user interface.

Referring to FIG. 15, a poet's assistant graphical user interface (GUI) 250 includes a word processing region 252 and a number of poet's assistant's windows 254, 256, and 258. Although only three poet's assistant's windows 254, 256, and 258 are shown, any number of poet's assistant's windows may be requested by a user. In the poet's assistant GUI 250, poet's assistant window 254 is a next word window. Poet's assistant window 256 is a finish line window, and poet's assistant window 258 is a finish poem window. Other windows that may be requested by the user include an alliteration window (not shown) and a rhymes/endings window (not shown).

Each of the poet's assistant windows 254-258 provide output in response to highlighted words generated by the user in the word processing region 252. Specifically, the next word window 254 provides suggestions for a next word in a style of a poet personality chosen by the user. The finish line window 256 provides suggestions for an entire line of text in the style of the poet personality chosen by the user. The finish poem window 258 provides a finished poem in the style of the poet personality chosen by the user.

The rhymes/endings window (not shown) provides suggestion of words that rhyme with the users inputted words in the poet's assistant GUI 250.

Each poet's assistant window 254-258 provides the user with a selection of author analysis models to be included in a poet personality.

As mentioned above, the user can have as many poet's assistant windows opened as desired. It is recommended that the user have multiple poet's assistant windows to provide as much stimulation as possible. For example, the user could have ten windows, three of which would be associated with a Robert Frost author analysis model, one in finish poem mode 258, one in finish line mode 256 and one in next word mode 254, two windows associated with a T. S. Elliot author analysis model and four other windows associated with other author analysis models.

Every time the user writes another word in the word processing region 252 using the word processing program or in any way modifies the poem he or she is writing, all of the poet's assistant windows 254-258 change. The user can use the mouse to select words or any size selection of text from any of the poet's assistant windows 254-258 to paste into the poem being composed by the user in the word processing region 252. Doing this would of course change the user's poem in the word processing region 252 and would cause all of the poet's assistance windows 254-258 to change and generate new suggestions.

A purpose of the poet's assistant GUI 250 is not necessarily to write the user's poems for him or her, but rather to spark the user's imagination, to help suggest words, phrases, ideas, etc. In writing poetry one of the most difficult aspects is finding ideas and suggestions for words and phrases. Such reference works as dictionaries, thesauruses, rhyming dictionaries, etc., are usually limited in their usefulness for this purpose. The poet's assistance mode is intended to provide a rich ever-changing source of such words and ideas.

As mentioned above, the poet's assistance GUI 250 also provides assistance in finding rhyme words in rhyme word window (not shown). The user can highlight words in the word processing region 252 from which rhymes are desired, and the poet's assistant rhyme window will suggest rhyme words that were actually used for the original author's that were analyzed in any of the selected author analysis models of the poet personality. The finish poem window 258 and finish line window 254 also write lines in poems that follow the appropriate rhyme structure.

The author analysis can also analyze his or her own poems as a basis for an author analysis model and then define one or more poet personalities based on his or her own work. In this way, in the poet assistant GUI 250, suggestions will be provided as to how the user himself or herself would finish a poem or line or suggest the next word based on that user's own work. A user can also generate poet personalities that combine his or her own author analysis model with the author analysis models from other authors.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A computer-implemented method of generating a poet personality comprising:
   analyzing by one or more computers a plurality of poems, each of the poems containing a plurality of words;
   generating by the one or more computers a plurality of analysis models, each of said analysis models representing one of said plurality of poems, by
      marking by the one or more computers words in the poems with rhyme numbers with words that rhyme with each other having the same rhyme number;
      generating by the one or more computers a data structure that specifies n-grams found in the text, with each analysis model having a set of weights, bigram, trigram and quadgram exponents; and
   storing the plurality of analysis models in a personality data structure including a set of parameters that control poetry generation using the personality data structure.

2. The computer-implemented method of claim 1 wherein the set of parameters in the personality data structure comprises a plurality of weights to weight each of the plurality of analysis models in the personality data structure.

3. The computer-implemented method of claim 2 wherein each of the plurality of weights comprises an integer value.

4. The computer-implemented method of claim 1, wherein the poems have corresponding authors, the method further comprising:
   defining weight value of authors corresponding to the poems within the personality data structure.

5. The computer-implemented method of claim 1, further comprising:
   defining weight values for each of a bigram, trigram and quadgram structures for one or more authors represented within the personality data structure.

6. The computer-implemented method of claim 1, further comprising:
   defining values of exponents for each of a bigram, trigram and quadgram structures for an author represented within the poet personality.

7. The computer-implemented method of claim 1 further comprising:
   providing a probability value of using a rhythm and/or rhyme structures of an author of the poems analyzed.

8. A system comprising:
   a processing unit; and
   a storage device storing a process to generate a poet personality by configuring the processing unit to:
      analyze a plurality of poems, each of the poems containing a plurality of words;
      generate a plurality of analysis models, each of said analysis models representing one of said plurality of poems;
      mark words in the poems with rhyme numbers with words that rhyme with each other having the same rhyme number;
      generate a data structure that specifies n-grams found in the text, with each analysis model having a set of weights, bigram, trigram and quadgram exponents; and
      store in computer storage the plurality of analysis models in a personality data structure including a set of parameters that control poetry generation using the personality data structure.

9. The system of claim 8 wherein the set of parameters in the personality data structure comprises a plurality of weights, to weight each of the plurality of analysis models in the personality data structure.

10. The system of claim 8 wherein the processing unit is further configured to:
   define weight value of authors corresponding to the poems within the personality data structure.

11. The system of claim 8 wherein the processing unit is further configured to:

define weight values for each of a bigram, trigram and quadgram structures for an author represented within the personality data structure.

12. The system of claim 8 wherein the processing unit is further configured to:

define values of exponents for each of a bigram, trigram and quadgram structures for an author represented within the poet personality.

13. The system of claim 8 wherein the processing unit is further configured to:

provide a probability value of using a rhythm and/or rhyme structures for an author of each of the poems analyzed.

14. A computer program product stored on a computer storage device, the product for generating a poet personality to configure a processor to:

analyze a plurality of poems, each of the poems containing a plurality of words;

generate a plurality of analysis models, each of said analysis models representing one of said plurality of poems;

receive for the words in the poems rhyme numbers, with words that rhyme with each other having the same rhyme number;

generate a data structure that specifies n-grams found in the text, with each analysis model having a set of weights, bigram, trigram and quadgram exponents; and store in computer storage the plurality of analysis models in a personality data structure including a set of parameters that control poetry generation using the personality data structure.

15. The product of claim 14 wherein the set of parameters in the personality data structure comprises a plurality of weights to weight each of the plurality of analysis models in the personality data structure.

16. The program of claim 14 wherein the program further configures the processing unit to:

define a weight value of an author represented within the personality data structure.

17. The program of claim 14 wherein the program further configures the processing unit to:

define a weight value for each of plural authors represented within the personality data structure.

18. The program of claim 14 wherein the program further configures the processing unit to:

define values of weight for each of a bigram, trigram and quadgram structures for an author within the personality data structure; and define values of exponents for each of a bigram, trigram and quadgram structures for an author within the poet personality.

19. The program of claim 14 wherein the program further configures the processing unit to:

provide a probability value of using a rhythm and/or rhyme structures for an author of each of the poems analyzed.

* * * * *